United States Patent [19]

Kennel

[11] Patent Number: 4,582,361
[45] Date of Patent: Apr. 15, 1986

[54] LIGHTWEIGHT SEAT FRAME FOR VEHICLES

[76] Inventor: Stephen W. Kennel, 2091 Ascot, Ann Arbor, Mich. 48103

[21] Appl. No.: 556,483

[22] Filed: Nov. 30, 1983

[51] Int. Cl.[4] ............................................. A47C 7/02
[52] U.S. Cl. .................................. 297/452; 248/429; 297/DIG. 1; 297/DIG. 2; 297/455
[58] Field of Search ............................... 248/429, 430; 297/DIG. 1, DIG. 2, 452, 455

[56] References Cited

U.S. PATENT DOCUMENTS

| | | | |
|---|---|---|---|
| 1,771,987 | 8/1930 | Cronwall | 248/429 |
| 1,794,650 | 3/1931 | Simpson et al. | 248/429 |
| 2,014,553 | 9/1935 | Browne | 248/430 |
| 2,130,159 | 9/1938 | Saunders et al. | 248/430 |
| 4,025,114 | 5/1977 | Cave | 297/DIG. 1 |
| 4,075,722 | 2/1978 | Rinard | 297/DIG. 1 |
| 4,147,336 | 4/1979 | Yamawaki et al. | 297/452 X |

*Primary Examiner*—James T. McCall
*Attorney, Agent, or Firm*—Stephenson and Boller

[57] ABSTRACT

A vehicle seat frame having "Z" section side rails which form part of a rigid cubic section. Each of the side rails has an upright web formed at its upper end with an integral outboard extending upper flange and at its lower end with an integral inboard extending lower flange. This arrangement provides for a load bearing surface for seating loads of increased width and frame mounting flanges that are closer together to enhance structural strength.

3 Claims, 6 Drawing Figures

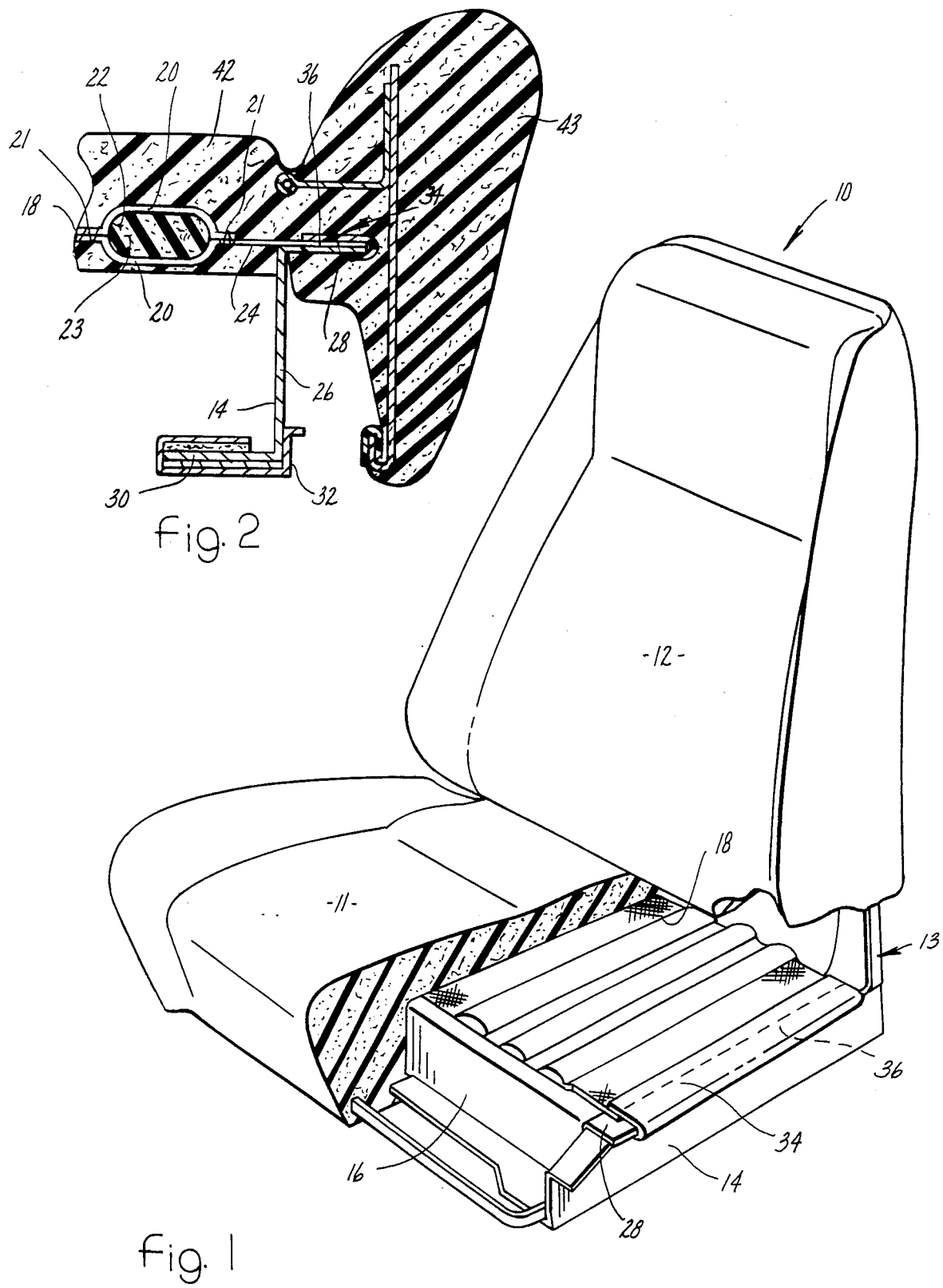

LIGHTWEIGHT SEAT FRAME FOR VEHICLES

BACKGROUND OF THE INVENTION

Lightweight seats have long been desired in many different types of vehicles, particularly, automobiles. The lightweight characteristic not only reduces the cost of the seating and thus the cost of the automobile, but also reduces the energy requirements for operating the vehicle.

The principal object of this invention, therefore, is to provide an improved lightweight seat frame for vehicles.

SUMMARY OF THE INVENTION

A satisfactory automobile seat must be able to withstand not only the normal loads associated with a seated individual, but also the load to which the seat is involved in safety and crash situations. The seat frame of this invention makes optimum use of structural material in reacting seat loads and also takes into account manufacturing concerns and seating comfort.

The seat frame of this invention includes a pair of side rails which are of a "Z" shape in cross section. By virtue of the "Z" shape of the side rails, the shear center in each side rail is located along the vertical wall of the section to thereby minimize the torsional loads to which the seat is subjected. The flanges at the bottoms of the side rails are directed inwardly toward each other to provide for a narrow attachment of the seat to the seat tracks without detracting from the comfort of the seat occupant. The flanges at the upper ends of the side rails are directed away from each other to thereby enlarge the effective horizontal surface of the seat for comfort purposes.

By virtue of having the vertical walls of the "Z" sections located inboard of the upper flanges, the ability of the seat to react applied loads is improved. The mounting locations are closer to the vertical shear wall of the section and the cantilevered effect found in current seats is reduced. For similar reasons, the seat frame of this invention includes a front rail member which extends between the side rails and is made of a "Z" section. This provides for a very stiff support for reacting the seating loads through the seat track mounting while also stiffening the side members laterally in the regions where the suspension is located. The front rail thus enhances the stiffness of the entire seat frame.

Another advantage of the "Z" section construction of the side rails is that it provides for a lightweight design because the cross members, such as the front rail are all shorter. The limiting feature in the past has been the clearance of the upper flange. With the "Z" section upper flange extending outboard, the seat frame can be narrower and the cross members thus become shorter. Since the stiffness of the frame is a cubic relationship with the distance between the shear centers, the frame of this invention is of increased stiffness.

Also, the "Z" shape of the structural members makes it easier to manufacture the seat frame of this invention since access of the welding mechanism to the parts of the frame that are welded is improved. Also, since "Z" sections are readily stacked, the seat frame components can be readily transported for assembly at the seat assembly location, if desired.

The "Z" shape of the side rails in the lightweight frame of this invention also enables the use of different suspension systems on the frame. Conventional sinuous seat springs are readily mounted on the upper flanges so that the suspension loads applied to the springs are transmitted to the Z-frame members directly above the section shear centers thereby minimizing the torsional load on the frame components. The outboard extending flanges on the upper ends of the side rails also promotes the use of a membrane suspension system which is readily secured to the flanges to provide a wider than usual load-bearing surface. Also, a thinner profile seat is achieved by mounting the seat suspension to the upper flanges of the Z-section frames. The amount of foam used in the seat can be greatly reduced since it is not necessary to encapsulate the entire frame rails in the foam.

The bottom flanges on the frame rails enable seat track adjusters to be incorporated directly into the seat frame. The seat frame of this invention is thus improved from a variety of standpoints principally because of the Z-section frame rails.

Further objects, features and advantages of this invention will become apparent from a consideration of the following description and appended claims when taken in connection with the accompanying drawing in which:

FIG. 1 is a perspective view of a vehicle seat assembly in which the lightweight frame of this invention is utilized, with some parts broken away and some parts shown in section for the purpose of clarity;

FIG. 2 is an enlarged transverse sectional view of a portion of the seat assembly shown in FIG. 1 and illustrating a Z-section side rail in the seat frame of this invention;

Figure 3:
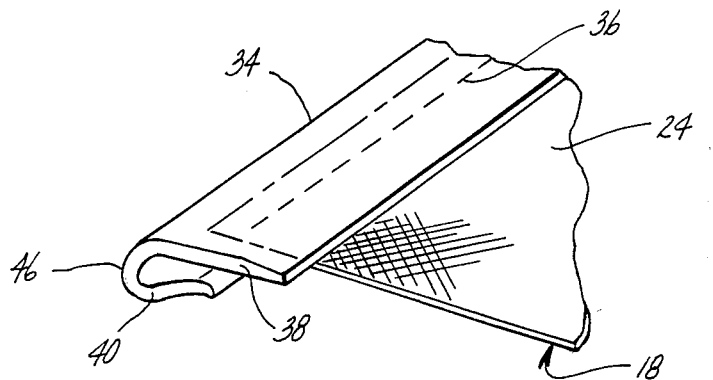
FIG. 3 is a perspective view of a portion of the seat frame of this invention.

With reference to the drawing, the seat frame of this invention, indicated generally at 10, is illustrated in FIG. 1 as constituting part of a seat assembly 11 having a cushion supporting portion 14 and a back section 16. As shown in FIGS. 1 and 3, the cushion portion 14 of the frame 10 consists of a pair of side rails 18, a front rail 20 which is secured to and extends between side rails 18 adjacent the front ends 22 thereof, and a rear rail 24 which is secured to and extending between the rear ends of the rails 18.

As shown in FIGS. 2 and 3, each of the side rails 18 is a "Z" section metal stamping, having an upright web 26, an upper flange 28, and a lower flange 30. The upper flanges 28 extend away from each other so that they extend in an outboard direction relative to the seat frame 10, and the lower flanges 30 extend toward each other in an inboard direction. Thus, the flanges 28 are spaced further apart than the flanges 30 which is advantageous from a structural standpoint as will be explained in greater detail hereinafter. The front rail 20 is also of a Z-shape having an upright web 32, an upper flange 34 which extends inboard and an outboard extending lower flange 36 spaced above the side rail lower flanges 30.

The back section 16 of the frame 10 is suitably secured to or formed integral with side rails 18, and a load supporting web 38 is mounted on the side rail flanges 28 by means of J-strips 40 as is more particularly described in co-pending application Ser. No. 556,482, filed 11-30-83 assigned to the assignee of this application.

Figure 4:
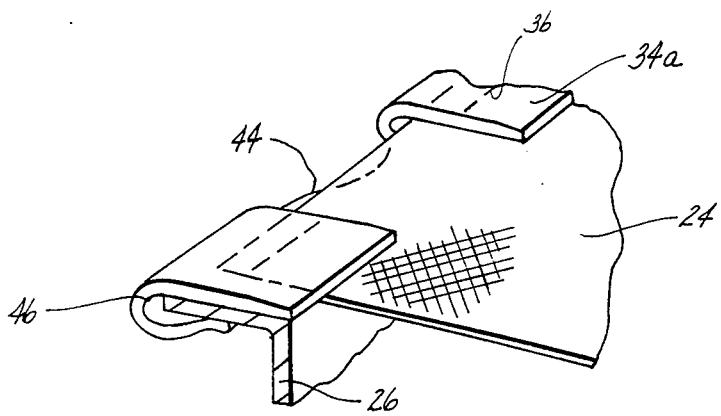
FIG. 4 is an enlarged transverse sectional view of a portion of the seat frame shown in FIG. 3, illustrating this portion in assembly relation with a supporting track.
Figure 6:
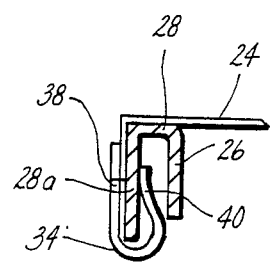
Figure 5:
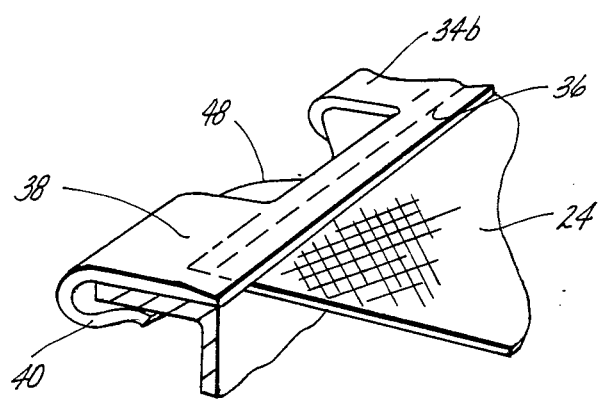

The "Z" section side rails 18 also enable the incorporation of the seat track adjusters into the seat frame 10, as illustrated in FIG. 4. The bottom flanges 30 of the side rails 18 are movably mounted in tracks 42, only one of which is shown, fixedly mounted on the vehicle frame to enable movement of the seat frame 10 in a direction fore and aft of the vehicle. As shown in FIG. 4, a track 42 consists of a bottom slide member 44 formed integral with a top slide member 46 which is positioned above and spaced from the slide 44. Upright flanges 48 cooperate with the slide members 44 and 46 to confine roller bearings 50 between the lower flange 30 of the side rail 18 and the top slide 46 to thereby facilitate sliding movement of the flange 30 on the rail 42. A layer 52 of low friction material, such as Teflon or nylon, is interposed between the slide 42 and the lower flange 30 to also promote easy fore and aft movement of the flange 30 on the slide 44. An upright flange 54 on the track 42 cooperates with one of the flanges 48 to confine the lower flange 30 against sideways movement relative to the slide 44. In the event the Z-rail 20 restricts movement of the frame 14 on the tracks 42, the rail 20 can be replaced by a simple tube extending between the side rail 14 and in the desired clearance relation with the tracks 42.

Alternatively, and as shown in FIG. 2, the roller bearings can be replaced by a second layer 56 of low friction material.

In the use of the seat assembly 11, with the improved seat frame of this invention, the disposition of the upper side flanges 28 so that they extend away from each other in directions outboard of the seat assembly 10 provides for a wider load bearing web 38. It is to be understood that the wider the load bearing web 38, the greater the seating comfort. Also, the disposition of the lower flanges 30 in the Z-section side rails 18 reduces the spacing between these rails thereby enabling a better support of the frame 10 with less bending stresses on the transverse portions of the frame, such as the front and rear rails 20 and 24, to thereby enable the use of a reduced amount of material in these rails 20 and 24.

The web 38 and the cushion portion 14 of the frame 10 are encapsulated within a foamed body 57 which includes side bolsters 58 as shown in FIG. 2, which functions to hold the components of the seat assembly 11 in desired fixed relative positions. The result is a low profile seat assembly 11 which can be constructed with a lighter weight frame 10 without sacrifice in seat comfort. This increased strength in the frame 10 with less structural material is the direct result of the formation of the side rails 18 of Z-sections.

The side rails 18 are illustrated as having straight flanges 28. It is to be understood that the flanges 28 can be curved in a direction fore and aft of the seat assembly 11 to enable the seat to be adjusted fore and aft of the vehicle to adapt to taller and shorter occupants. This is readily accomplished in the seat frame 10 of this invention by originally forming the side rails 18 to a desired shape to accommodate adjustment.

What is claimed is:

1. In a vehicle seat, a frame having a cushion portion and a back portion, said cushion portion including a pair of generally parallel side rails having front and rear ends, a front rail secured to and extending between the front end of said side rails and a rear rail secured to and extending between the rear ends of the said side rails, each of said side rails being of substantially Z-shape having an upright web with an outwardly extending flange at the upper end thereof and an inwardly extending flange at the lower end thereof and means supported on said upper flanges and extending therebetween for supporting seating loads, said front rail also being of Z-shape having an upright web and flanges which extend in opposite directions from the upper and lower ends of the web.

2. In a vehicle seat, a frame having a cushion portion and a back portion, said cushion portion including a pair of generally parallel side rails having front and rear ends, a front rail secured to and extending between the front ends of said side rails and a rear rail secured to and extending between the rear ends of the said side rails, each of said side rails being of substantially Z-shape having an upright web with an outwardly extending flange at the upper end thereof and an inwardly extending flange at the lower end thereof, and a load bearing web extending between and supported on said upper side rail flanges, and means secured to said web and arranged in an interfitting relation which said top side rail flanges for maintaining said web in a pre-stretched condition.

3. In a vehicle seat, a frame having a cushion portion and a back portion, said cushion portion including a pair of generally parallel side rails having front and rear ends, a front rail secured to and extending between the front ends of said side rails and a rear rail secured to and extending between the rear ends of the said side rails, each of said side rails being of substantially Z-shape having an upright web with an outwardly extending flange at the upper end thereof and an inwardly extending flange at the lower end thereof and means supported on said upper flanges and extending therebetween for supporting seating loads, and means supporting said frame comprising slide means arranged in a supporting relation with at least one of the lower flanges on said side rails.

* * * * *